United States Patent
Guissin (10) Patent No.: US 11,463,627 B2
(45) Date of Patent: Oct. 4, 2022

(54) STEP-STARE WIDE FIELD IMAGING SYSTEM AND METHOD

(71) Applicant: Eshel Aviv Ltd., Herzliya (IL)

(72) Inventor: Avraham Ram Guissin, Beit Yanai (IL)

(73) Assignee: ESHEL AVIV LTD., Herzliya (IL)

( * ) Notice: Subject to any disclaimer, the term of this patent is extended or adjusted under 35 U.S.C. 154(b) by 227 days.

(21) Appl. No.: 16/761,569

(22) PCT Filed: Nov. 7, 2018

(86) PCT No.: PCT/IL2018/051189
§ 371 (c)(1),
(2) Date: May 5, 2020

(87) PCT Pub. No.: WO2019/092705
PCT Pub. Date: May 16, 2019

(65) Prior Publication Data
US 2020/0275006 A1    Aug. 27, 2020

(30) Foreign Application Priority Data

Nov. 9, 2017    (IL) .......................................... 255559

(51) Int. Cl.
*H04N 5/225*    (2006.01)
*H04N 5/235*    (2006.01)
(Continued)

(52) U.S. Cl.
CPC ............ *H04N 5/2352* (2013.01); *G03B 9/08* (2013.01); *G03B 37/00* (2013.01); *H04M 1/0264* (2013.01); *H04N 5/2254* (2013.01)

(58) Field of Classification Search
CPC ............................ H04N 5/2254; H04N 5/247
(Continued)

(56) References Cited

U.S. PATENT DOCUMENTS

| 3,013,468 A | 4/1953 | Leach |
| 5,727,242 A | 3/1998 | Lo et al. |

(Continued)

FOREIGN PATENT DOCUMENTS

| DE | 102016204148 | 9/2017 |
| EP | 0377914 | 11/1989 |
| WO | WO 2017/029376 | 2/2017 |

OTHER PUBLICATIONS

Search Report of International Application No. PCT/IL2018/051189 dated Feb. 11, 2019.

*Primary Examiner* — Anthony J Daniels
(74) *Attorney, Agent, or Firm* — Pearl Cohen Zedek Latzer Baratz LLP (57) ABSTRACT

An imaging system includes a stationary imager. An opaque enclosure includes a plurality of apertures at different locations on the enclosure and a plurality of stationary beam splitters arranged within the enclosure such that light that enters the enclosure through each of the apertures is directed to the imager. A shutter unit includes an opaque surface that includes at least one window. The shutter unit is rotatable relative to the enclosure such the window is sequentially aligned with each of the apertures to enable light from a field of view to enter the enclosure through that aperture, the opaque surface preventing light from concurrently entering the enclosure through more than one of the apertures.

12 Claims, 9 Drawing Sheets

(51) Int. Cl.
    *G03B 37/00*    (2021.01)
    *H04M 1/02*    (2006.01)
    *G03B 9/08*    (2021.01)

(58) Field of Classification Search
    USPC .................................................. 348/207.99
    See application file for complete search history.

(56) References Cited

U.S. PATENT DOCUMENTS

| | | | |
|---|---|---|---|
| 6,992,699 B1* | 1/2006 | Vance | H04N 7/142 |
| | | | 348/207.99 |
| 10,362,234 B2* | 7/2019 | Jamula | G03B 11/045 |
| 2007/0019103 A1 | 1/2007 | Lieberman et al. | |
| 2011/0115882 A1 | 5/2011 | Shahinian | |
| 2014/0132804 A1* | 5/2014 | Guissin | G08B 13/19602 |
| | | | 348/239 |
| 2016/0116731 A1* | 4/2016 | Peters | G02B 23/2484 |
| | | | 359/399 |
| 2017/0214861 A1* | 7/2017 | Rachlin | G02B 27/1066 |
| 2020/0404197 A1* | 12/2020 | Gassend | G01S 17/89 |
| 2021/0108922 A1* | 4/2021 | Dawson | B64D 47/08 |

* cited by examiner

STEP-STARE WIDE FIELD IMAGING SYSTEM AND METHOD

CROSS-REFERENCE TO RELATED APPLICATIONS

This application is a National Phase Application of PCT International Application No. PCT/IL2018/051189, International Filing Date Nov. 7, 2018, entitled "Step-Stare Wide Field Imaging System Method", published on May 16, 2019 as International Patent Application Publication No. WO 2019/092705, claiming the benefit of Israeli Patent Application No. 255559, filed Nov. 9, 2017 and now abandoned, which is incorporated herein by reference in its entirety.

FIELD OF THE INVENTION

The present invention relates to the field of imaging, and more particularly, to a step-stare wide field imaging system and method.

BACKGROUND OF THE INVENTION

Advanced imaging and video surveillance requirements call for enlarged detector formats (i.e. number of pixels) enabling a wider coverage field of view (FOV), improved angular resolution (AR) by reduced pixel dimensions, refined imaging detector pixel sensitivity (PS), increased detector readout frame rates (FR), reduced system costs, and decreased system dimensions or form factor (FF). In addition, when extensive angular coverage imaging is required, the FOV may be swept angularly in achieving a broader field of regard (FOR).

Imaging performance is generally evaluated in terms of operation during daytime and nighttime, under low light conditions, under different environmental factors, and combined use of spectral bands and with ambient or artificial illumination sources in improving and optimizing performance.

SUMMARY OF THE INVENTION

There is thus provided, in accordance with an embodiment of the present invention, an imaging system including: a stationary imager; an opaque enclosure including a plurality of apertures at different locations on the enclosure, a plurality of stationary beam splitters arranged within the enclosure such that light that enters the enclosure through each of the apertures is directed to the imager; and a shutter unit including an opaque surface that includes at least one window, the shutter unit rotatable relative to the enclosure such that the at least one window is sequentially aligned with each aperture of the plurality of apertures to enable light from a field of view to enter the enclosure through that aperture, the opaque surface preventing light from concurrently entering the enclosure through more than one of the apertures.

Furthermore, in accordance with an embodiment of the present invention, each aperture of the plurality of apertures is configured to enable light to enter the enclosure from a different field of view.

Furthermore, in accordance with an embodiment of the present invention, at least two of the different fields of view include adjacent fields of view.

Furthermore, in accordance with an embodiment of the present invention, the system includes an illumination source that is configured to illuminate each field of view of the plurality of fields of view concurrently with the at least one window being aligned with the aperture of the plurality of apertures that is configured to enable light to enter the enclosure from that field of view.

Furthermore, in accordance with an embodiment of the present invention, an aperture of the plurality of apertures is provided with a reflector to reflect light into the aperture from the field of view.

Furthermore, in accordance with an embodiment of the present invention, each aperture of the plurality of apertures is provided with an objective lens.

Furthermore, in accordance with an embodiment of the present invention, the imaging device is provided with a relay lens.

Furthermore, in accordance with an embodiment of the present invention, the opaque surface includes two concentric disks on opposite sides of a beam splitter of the plurality of beam splitters, each of the disks including an eccentric window of the at least one window, the eccentric window of one of the disks rotated about a common axis of the disks, such that when the eccentric window of one of the disks is positioned to enable light to impinge on that beam splitter via an aperture of the plurality of apertures on one side of that beam splitter, the other disk blocks entry of light through another aperture on an opposite side of that beam splitter.

Furthermore, in accordance with an embodiment of the present invention, the surface includes a concave surface that is rotatable about the plurality of apertures, the concave surface including an axial window of the at least one window, and a lateral window of the at least one window, the lateral window being non-coplanar with the axial window.

Furthermore, in accordance with an embodiment of the present invention, the shutter unit includes a drive motor for rotating the opaque surface.

Furthermore, in accordance with an embodiment of the present invention, the drive motor is a direct current motor.

Furthermore, in accordance with an embodiment of the present invention, the stationary imager includes a camera of a mobile phone that is attachable to the enclosure.

Furthermore, in accordance with an embodiment of the present invention, the system includes a device configured to acquire an image of the field of view in a spectral range that is different from a spectral range of the imager.

There is further provided, in accordance with an embodiment of the present invention, a step-stare imaging method including: rotating a shutter unit relative to an opaque enclosure, the opaque enclosure including a plurality of apertures at different locations on the enclosure, a plurality of stationary beam splitters arranged within the enclosure such that light that enters the enclosure through each of the apertures is directed to a stationary imager, the shutter unit including an opaque surface that includes at least one window, such that the rotation sequentially aligns the at least one window with each aperture of the plurality of apertures to enable light to enter the enclosure through that aperture, the opaque surface preventing light from concurrently entering the enclosure through more than one of the apertures; and operating the imager to acquire an image of a field of view via an aperture of the plurality of apertures when the at least one window is aligned with that aperture.

Furthermore, in accordance with an embodiment of the present invention, the method includes combining into an image of a field of regard the images of different fields of view that are acquired via different apertures of the plurality of apertures when the at least one window is aligned with each of the different apertures.

Furthermore, in accordance with an embodiment of the present invention, at least two of the different fields of view are adjacent to one another.

Furthermore, in accordance with an embodiment of the present invention, the method includes concurrently with operating the imager to acquire the image, acquiring an additional image of the field of view in a spectral range that is different from a spectral range of the imager.

Furthermore, in accordance with an embodiment of the present invention, the method includes concurrently with operating the imager to acquire the image, illuminating the field of view.

Furthermore, in accordance with an embodiment of the present invention, an object in the field of view is provided with a reflector.

Furthermore, in accordance with an embodiment of the present invention, the method includes processing the acquired image to enhance visibility of an object in the field of view.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

A wide-field imaging system in accordance with an embodiment of the present invention may provide a cost-effective solution to enable wide field of regard (FOR) coverage, high sensitivity during daytime and nighttime imaging, and both human observation and automated image analysis to the entire FOR in a robust manner under diverse imaging situations.

The wide-field imaging system may enable imaging of a wide FOR that includes multiple fields of view (FOV), while the only moving optical component is a shutter assembly, thus reducing requirements in size, cost, and power consumption over other systems with similar capabilities.

Typically, the wide-field imaging system includes an imager in the form of a detector with an array (typically two-dimensional) of light-sensitive cells or pixels in one or more spectral ranges, imaging optics (e.g., including one or more lenses, reflectors, collimators, apertures, filters, or other components), and associated electronics for acquiring sequences of images or video frames. The imager may be characterized by its resolution, exposure sensitivity, spectral range, dynamic range, or other characteristics. The imager is stationary within the wide-field imaging system. As used herein, a component of the wide-field imaging system is referred to as stationary if, during normal use of the wide-field imaging system (e.g., not during assembly or maintenance), the component does not move unless the entire system is moved.

The wide-field imaging system includes an optical switching arrangement for changing the field of view that is currently imaged by the imager. The optical switching arrangement includes an opaque housing that encloses the imager. The housing includes two or more apertures at different locations on the housing to enable light to enter the housing. For example, each aperture may be configured (e.g., by its orientation, by reflectors or other bending optics, by a combination of orientation and bending optics, or otherwise) to admit light from a different field of view. The different fields of view may be adjacent (e.g., abutting or partially overlapping), or may have another spatial arrangement.

One or more stationary beam splitters are arranged within the housing. The beam splitters are oriented such that light that enters the housing through any of the apertures is directed, e.g., by reflection off of partially reflective surfaces, by transmission through the partially reflective surfaces, or both, toward the imager. Thus, if two or more of the apertures were to be opened concurrently, the imager would acquire an image that is a superposition of the fields of view of those two or more apertures.

A shutter unit is configured to restrict concurrent entry of light into the housing of the optical switching arrangement to no more than a single aperture. (There may be periods of time when entry of light from all of the apertures is blocked.) The shutter unit is rotatable, e.g., at a constant rotational velocity or otherwise. Therefore, the shutter unit is typically the only moving part within the wide-field imaging system.

The shutter unit includes an opaque surface that is rotatable over or within the apertures. Depending on the orientations and positions of the apertures on the surface of the housing, the opaque surface may be flat or curved (e.g., concave as viewed from the side of the housing). For example, if all of the apertures are positioned on a single side of the housing (e.g., are coplanar), the opaque surface of the shutter unit may be in the form of a flat disk. If the apertures are arranged on different sides of the housing, e.g., at right angles or at oblique angles to at least some of the other apertures, the opaque surface may be in the form of a concave surface that covers all of the apertures. When the apertures are arranged on different lateral sides of the housing, the opaque surface may be in the form of a cylinder with circular or polygonal cross section. The opaque surface is configured (e.g., shaped and positioned) to prevent ambient light from entering any aperture that is covered by the opaque surface.

The opaque surface of the shutter unit includes one or more windows. Rotation of the shutter unit is configured such that at least one of the windows is periodically brought into alignment with each of the apertures. When a window of the shutter unit is aligned (fully or partially) with an aperture, light may enter that aperture. The windows are arranged on the opaque surface such that when one of the windows is aligned with one of the apertures, all of the other apertures are completely covered by the opaque surface. Thus, any light that is directed to the imager by the optical switching arrangement has entered the opaque housing via a single aperture. Therefore, an image that is acquired by the imager concurrently with the alignment may be an image only of the exposed field of view of that aperture.

Typically, the windows may be arranged on the opaque surface such that a simple rotation of the opaque surface at a constant rotational velocity will expose each of the fields of view periodically at approximately equal intervals. The shutter unit may be made sufficiently light such that a simple direct current motor, e.g., a motor that is designed for rotating an optical disk in a compact disc (CD) drive or digital versatile disc (DVD) drive, may be used for rotating the shutter unit.

Imaging optics for forming an image of the exposed field of view on the detector of the imager may be located at the imager (e.g., similar to a typical camera). However, in some cases, the optics within the housing, and thus the overall size of the housing, may be made more compact by placement of objective optics (e.g., an objective lens assembly) for imaging each field of view at each of the apertures. Typically, when the objectives are located at the apertures, the imager may be provided relay optics (e.g., a relay lens assembly).

Depending on the arrangement of beam splitters within the optical switching arrangement, one or more of the apertures may be provided with a compensating filter, e.g., to compensate for differences in absorption (e.g., either total or spectral) along optical paths from different apertures to the imager. In some cases, such differences may be compensated for during processing of the images.

Typically, each aperture is configured to enable entry of light from one of a plurality of adjacent fields of view that together form a single field of regard. A processor of the wide-field imaging system may be configured to combine images of the adjacent fields of view into a single combined image.

In some cases, the wide-field imaging system may be provided with a directional illumination system. For example, the illumination system may be controllable such that the field of view of only one of the apertures is illuminated (e.g., fully or partially) when that field of view is exposed by the shutter unit.

Examples of wide-field imaging systems as described herein may be advantageous over other imaging systems that are designed to cover an extended FOR at high resolution. Such other systems typically utilize point-tilt-zoom (PTZ) devices on which the cameras (and optional illuminators) are installed. The rate at which the PTZ can be panned and tilted may be limited by limits on the maximum angular velocity and acceleration rates of the PTZ device, as well as by image blurring. PTZ devices that are designed for faster rates are typically both bulky and expensive, as are alternative devices such as stabilized gimbaled payloads.

A wide-field imaging system as described herein may utilize imaging detector technologies such as large format, back-side illumination complementary metal-oxide-semiconductor (CMOS) sensors for the visible and near infrared spectral bands, which have extreme sensitivity (high ISO, e.g., 100,000 to 400,000). For example, a wide-field imaging system as described herein using a 4000×3000 pixel, or 12 megapixel, CMOS detector can be switched between four FOVs, resulting in a 16000×3000 pixel (54 megapixel) FOR Similarly, an 8000×6000 pixel (48 megapixel) detector similarly results in a 32000×6000 pixel (about 200 megapixel) FOR. Large format detectors may become available with 12000×9000 pixels (about 100 MP), enabling a 48000× 9000 pixel (about 400 megapixel) FOR. Such large formats may be effectively applied in applications requiring wide area coverage while maintaining very high resolution, a high update rate, and an affordable cost.

A wide-field imaging system as described herein may be designed to acquire images in one or more for spectral including visible light (VIS), near infrared (NIR), short wave infrared (SWIR), middle wave infrared (MWIR), or long wave infrared (LWIR).

In some applications, additional scanning and modulated illuminators at selected spectral bands may be utilized. For example, such illumination may assist in increasing contrast or visibility of small objects, under difficult environmental conditions, or otherwise.

In some cases, the wide-field imaging system may be utilized to image coast lines, seaports, marinas, or other offshore regions, for example, for situation awareness, security, safety, antitheft, and search and rescue. Monitored situations may include public and private beaches, extreme water sports, illegal emigration, deep-water fishing in extreme weather and high seas, and other high risk marine situations. When using visible and NIR imaging, sufficient illumination may be provided by starlight conditions, additionally supplemented by artificial illumination. During daylight conditions, such illumination may improve detection performance when using spectral filters at the camera input. When using illumination, rescue applications may be facilitated by reflectors that are worn by people in the area.

In some cases, the wide-field imaging system may be utilized to image infrastructure, airports, or borders by day/night detection of objects on land and in the air. In some cases, the wide-field imaging system may be utilized for imaging airborne search and rescue operations, or for increasing safety of maritime navigation. The imaging device may be used as a black box in various emergency situations as it can record and transmit detailed images to remote control rooms and rescue platforms, and may be installed at various locations on a vessel. In some cases, the wide-field imaging system may be utilized to image mass crowd events, for example, in surveillance of broad crowded areas such as sports stadiums and arenas, airports, shopping centers, concerts, demonstrations, and other situations. The FOR may be wide enough to cover a significant area, while the images may be sufficiently detailed to enable visual or automatic face identification technologies and techniques. In some cases, the wide-field imaging system may be utilized to image for urban safety, for example, in the surveillance of sea ports and marinas, shopping centers and markets, airports, transport stations, infrastructures, and restricted areas. Imaging in several spectral bands may be utilized to increase visibility of some imaged objects.

Figure 1:
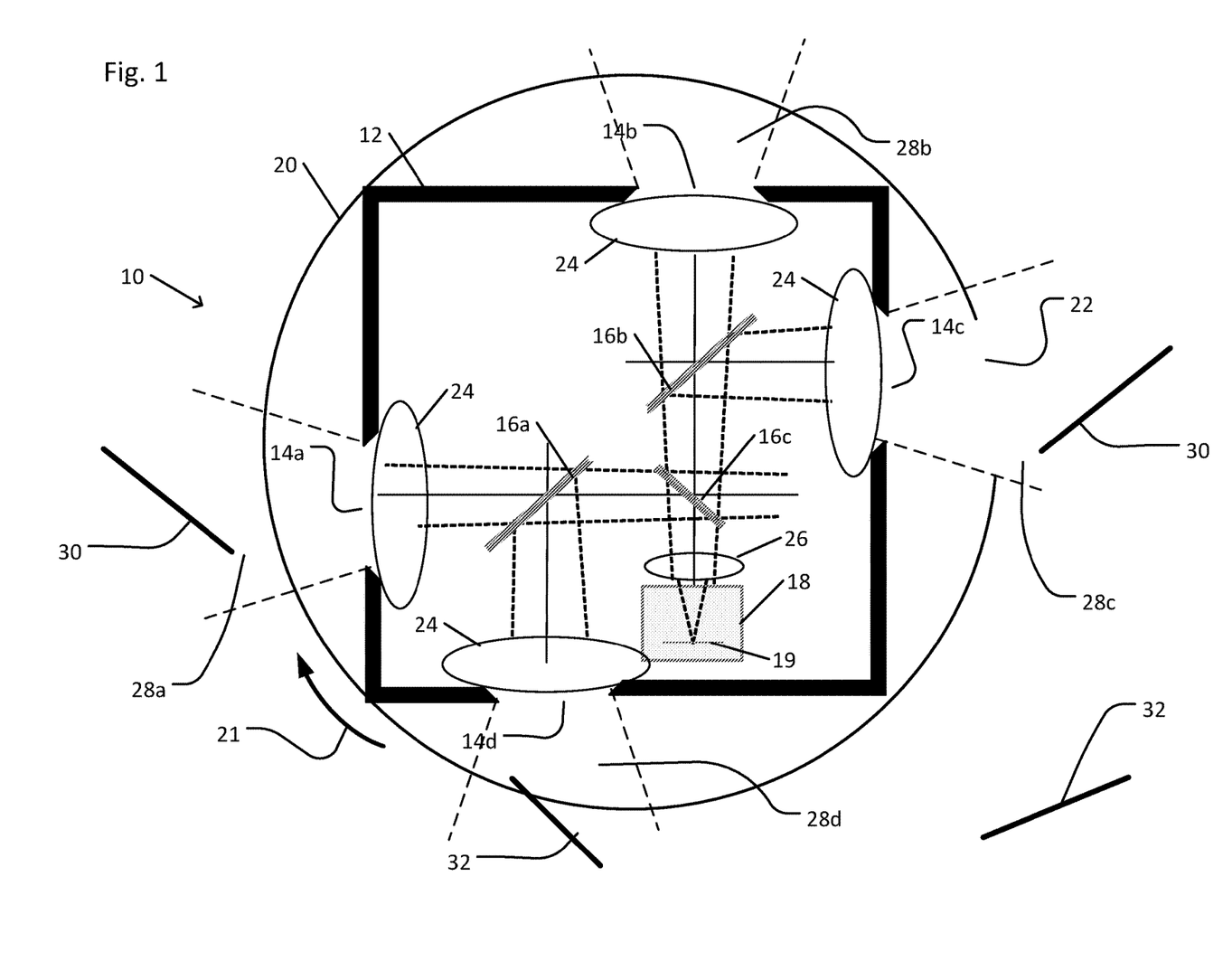
FIG. 1 schematically illustrates a wide-field imaging system in accordance with an embodiment of the present invention.

FIG. 1 schematically illustrates a wide-field imaging system in accordance with an embodiment of the present invention.

Wide-field imaging system 10 is configured to direct light (to be understood as including any type of electromagnetic radiation that be imaged using typical optical focusing elements, typically in the spectral range from the thermal infrared to the ultraviolet) originating in a plurality of fields of view 28a-28d (in the example shown, where the number of imaged fields of view may be greater than or smaller than four) to an imager 18 via a corresponding plurality of apertures 14a-14d.

Imager 18 includes detector 19. Typically, detector 19 includes an array of light-sensitive detector elements that are each configured to generate an electrical signal in response to light that impinges on it. Imager 18 may be provided with imager optics 26 (e.g., representing an assembly of lenses, or additional optical components). In some cases, imager optics 26 may include complete imaging optics for forming an image of a distant field of view 28a-28d on detector 19. In this case, aperture optics 24 may not include any focusing elements (or any other elements that effect the direction of light rays). In other cases, imager optics 26 may include relay optics (e.g., a relay lens arrangement), while objective optics (e.g., objective lens arrangements) may be included in aperture optics 24.

Imager 18 (or at least a side of imager 18 via which light is configured to enter to detector 19) is enclosed within opaque enclosure 12. For example, opaque enclosure 12 may have a rectangular or box-like shape as indicated in the example shown, or may have another shape. Thus, light that is to be directed to imager 18 may enter opaque enclosure 12 only via one of enclosure apertures 14a-14d in the opaque wall of opaque enclosure 12.

Opaque enclosure 12 encloses one or more beam splitters, such as beam splitters 16a-16c in the example shown. Each beam splitter 16a-16c is configured to reflect a fraction of light that impinges on it, while transmitting the remainder. The reflectance and transmittance of the beam splitter 16a-16c typically depends on the angle of incidence of the impinging light. For example, a typical beam splitter 16a-16c may be configured to reflect approximately half of the light intensity that impinges on it at an angle of about 45°, while transmitting approximately half of the light without perceptible angular deviation.

In the example shown, light that enters opaque enclosure 12 from field of view 28a via enclosure aperture 14a may be transmitted by beam splitter 16a and reflected by beam splitter 16c toward imager 18. Light that that enters opaque enclosure 12 from field of view 28b via enclosure aperture 14b may be transmitted by beam splitter 16a and by beam splitter 16c toward imager 18. Light that enters opaque enclosure 12 from field of view 28c via enclosure aperture 14c may be reflected by beam splitter 16b toward beam splitter 16c where it is transmitted toward imager 18. Light that enters opaque enclosure 12 from field of view 28d via enclosure aperture 14d may be reflected by beam splitter 16a to beam splitter 16c where it is reflected toward imager 18.

Shutter unit 20 includes an opaque surface with window 22. Although shutter unit 20 is depicted in FIG. 1, for the sake of clarity and convenience, as located outside of opaque enclosure 12, shutter unit 20 is more typically enclosed within opaque enclosure 12. The opaque surface of shutter unit 20 is configured to block light from entering any of enclosure apertures 14a-14d other than an enclosure aperture 14a-14d with which window 22 is at least partially aligned. In the example shown, window 22 is aligned with enclosure aperture 14c, thus enabling light from field of view 28c to enter opaque enclosure 12 to be directed to imager 18. Light from any of fields of view 28a, 28b, and 28d is prevented by the opaque wall of shutter unit 20 from entering opaque enclosure 12 through any of enclosure apertures 14a, 14b, or 14c.

Rotation of shutter unit 20 with rotation 21 brings window 22 into alignment with each of enclosure apertures 14a-14d in turn. Thus, imager 18 is exposed sequentially to light that originates from each of fields of view 28a-28d, while light from the other fields of view is prevented from reaching imager 18. Therefore, images of each of fields of view 28a-28d may be acquired sequentially.

In some cases, one or more of enclosure apertures 14a-14d may be provided with redirecting optics that enables light from a field of view that is not directly opposite an enclosure aperture 14a-14d to enter that aperture. For example, redirecting optics in the form of a single reflector 30, or in the form of a multiple reflectors 32, or another arrangement of reflectors, refracting elements, or other optical components, may be provided. In the example shown, single reflectors 30 and double reflectors 32 may enable light to enter each of enclosure apertures 14a, 14c and 14d from fields of view that are in the same general direction as, e.g., adjacent to, field of view 28b.

Figure 2:
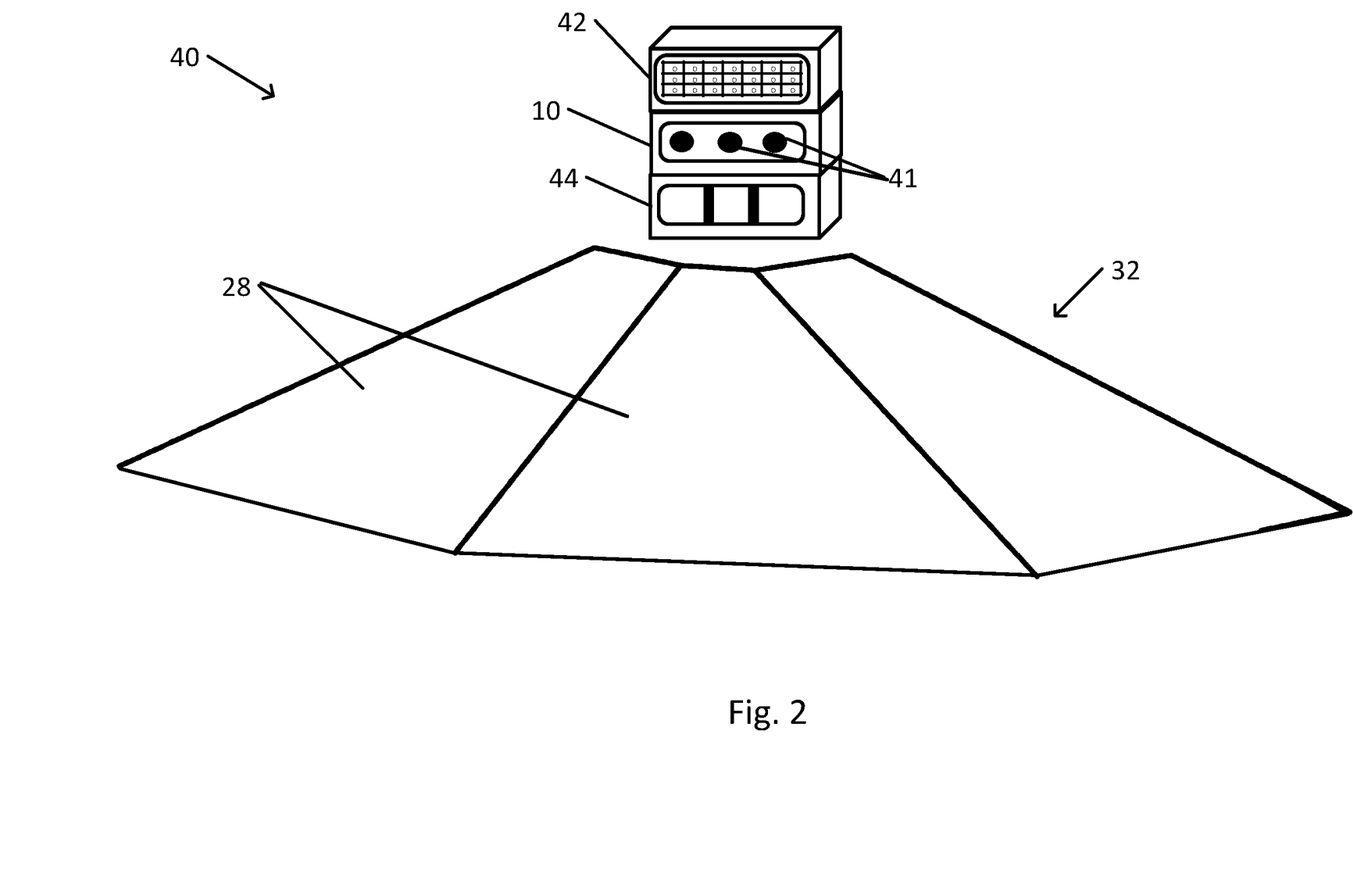
FIG. 2 schematically illustrates a monitoring system that incorporates the wide-field imaging system as shown in FIG. 1.

FIG. 2 schematically illustrates a monitoring system that incorporates the wide-field imaging system as shown in FIG. 1.

Monitoring system 40 includes at least one wide-field imaging system 10. Wide-field imaging system 10 is configured to acquire images of a plurality of fields of view 28 (three, in the example shown) via a corresponding plurality of apertures 41. Apertures 41 may correspond to apertures similar to enclosure apertures 14a-14d, or may correspond to apertures in a housing that encloses wide-field imaging system 10, and any redirecting optics.

Thus, monitoring system 40 may acquired images of a field of regard 32 whose width is equal to the combined widths of fields of view 28. Each field of view 28, and thus field of regard 32, is characterized by another dimension (not indicated in FIG. 2). For example, if fields of view 28 are understood as representing adjacent horizontal sectors, fields of view 28 and field of regard 32 are also characterized by a vertical dimension (e.g., an angular distance above or below the horizon). In some cases (e.g., when monitoring air space or a scene that includes vertical features such as buildings or mountains), at least some of the fields of view of wide-field imaging system 10 may be arranged so as to be adjacent in the vertical dimension to other of the fields of view.

Monitoring system 40 may include a directional illumination unit 42 that is configured to selectively illuminate each field of view 28. For example, directional illumination unit 42 may include a multiple light emitting diode (LED) flood light source, or another type of directional illumination system. In some cases, the fields of view that are selectively illuminated by directional illumination unit 42 may be larger or smaller than a field of view 28 of wide-field imaging system 10.

In some cases, a monitoring system 40 may include one or more additional imaging devices 44. For example, an imaging device 44 may include a directional system similar to wide-field imaging system 10, a rotating camera, an array of differently oriented cameras, or another imaging device that is configured to sequentially acquire images of different fields of view 28. In some cases, monitoring system 40 may include a wide-field imaging system 10 that is configured to acquire images in visible light, while imaging device 44 is configured to acquire images in another spectral band (e.g., the thermal infrared or another spectral band).

Various configurations of shutter unit 20 may be incorporated into wide-field imaging system 10.

Figure 3A:
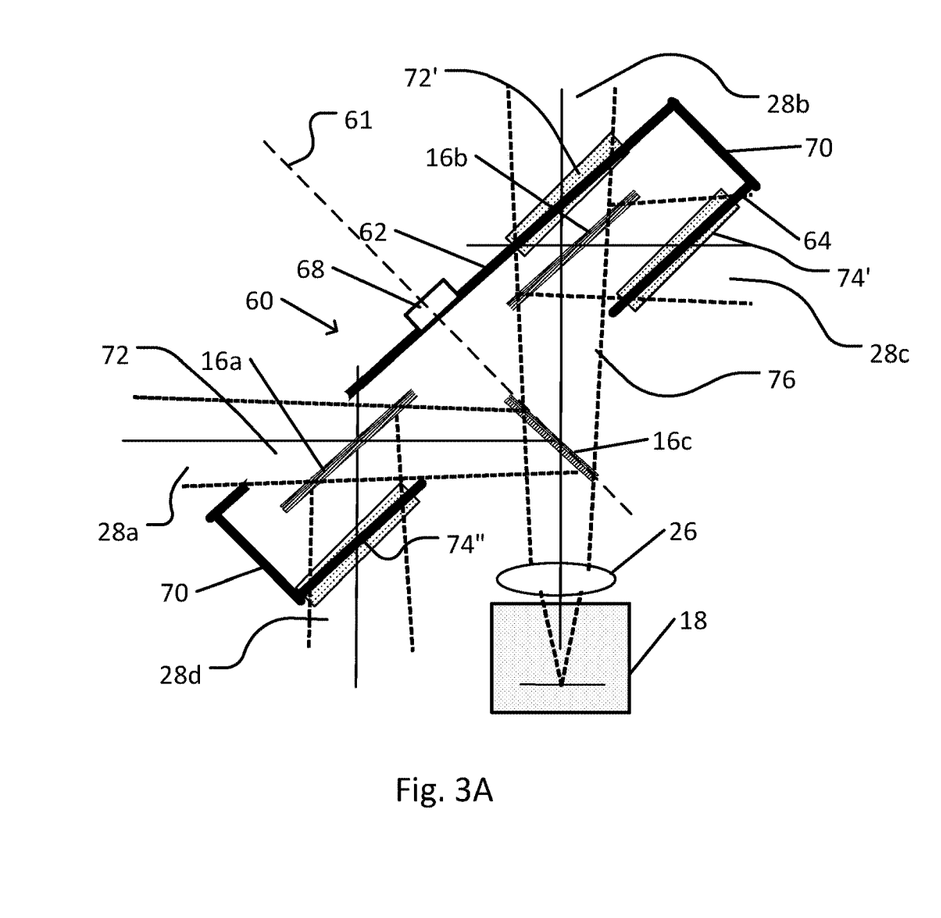
FIG. 3A schematically illustrates a cross section of optical components of a wide-field imaging system having a shutter unit with two parallel disks.

FIG. 3A schematically illustrates a cross section of optical components of a wide-field imaging system having a shutter unit with two parallel disks.

Shutter unit 60 is configured to be rotated by shutter drive motor 68 about shutter rotation axis 61. For example, shutter drive motor 68 may include a direct current motor, or another type of motor. Typically, shutter drive motor 68 is configured to rotate shutter unit 60 at a constant angular velocity about shutter rotation axis 61.

Shutter unit 60 includes two parallel opaque disks, distal shutter disk 62 and proximal shutter disk 64, held together by one or more brackets 70. In the arrangement shown, distal shutter disk 62 is located distal to beam splitters 16a and 16b from imager 18, while proximal shutter disk 64 is located proximal to beam splitters 16a and 16b.

Figure 3B:
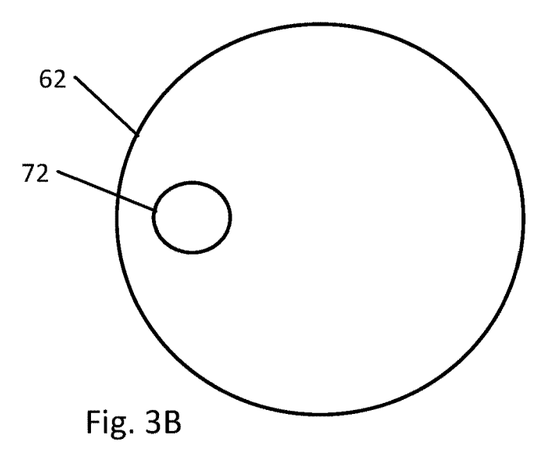
FIG. 3B schematically illustrates a distal shutter disk of the shutter unit shown in FIG. 3A.
Figure 3C:
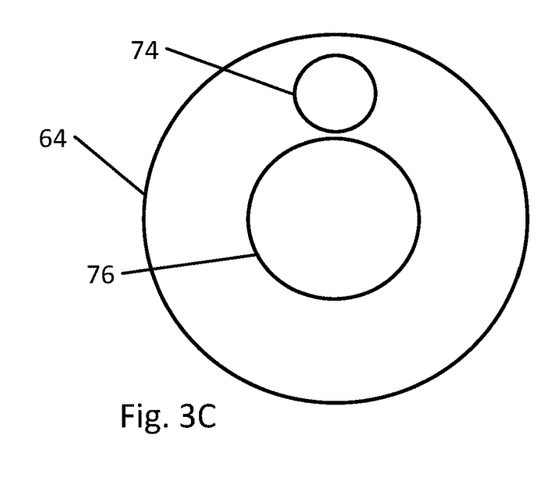
FIG. 3C schematically illustrates a proximal shutter disk of the shutter unit shown in FIG. 3A.

FIG. 3B schematically illustrates a distal shutter disk of the shutter unit shown in FIG. 3A. FIG. 3C schematically illustrates a proximal shutter disk of the shutter unit shown in FIG. 3A.

In the example shown, distal shutter disk 62 includes a single distal window 72. Proximal shutter disk 64 includes central opening 76 and a single proximal window 74. When distal shutter disk 62 and proximal shutter disk 64 are held together by brackets 70 to form shutter unit 60, proximal window 74 is rotated about shutter rotation axis 61 relative to distal window 72. In the example shown, proximal window 74 is rotated by about 90° relative to distal window 72. The relative rotation of proximal window 74 relative to distal window 72 is sufficient so as to prevent light from more than one of fields of view 28a-28d from reaching imager 18.

In the example shown, light from field of view 28a is enabled to impinge on beam splitter 16a via distal window 72 so that it is redirected to imager 18 via beam splitter 16c. Light from fields of view 28b-28d is prevented from impinging on any of beam splitters 16a-16c and from reaching imager 18.

When distal window 72 is rotated to position 72', light from field of view 28b is enabled to reach imager 18 via beam splitters 16b and 16c, and via central opening 76. When proximal window 74 is rotated to position 74', light from field of view 28c is enabled to reach imager 18 via beam splitters 16b and 16c, and via central opening 76. When proximal window 74 is rotated to position 74", light from field of view 28d is enabled to reach imager 18 via beam splitters 16a and 16c, and via central opening 76.

Figure 4:
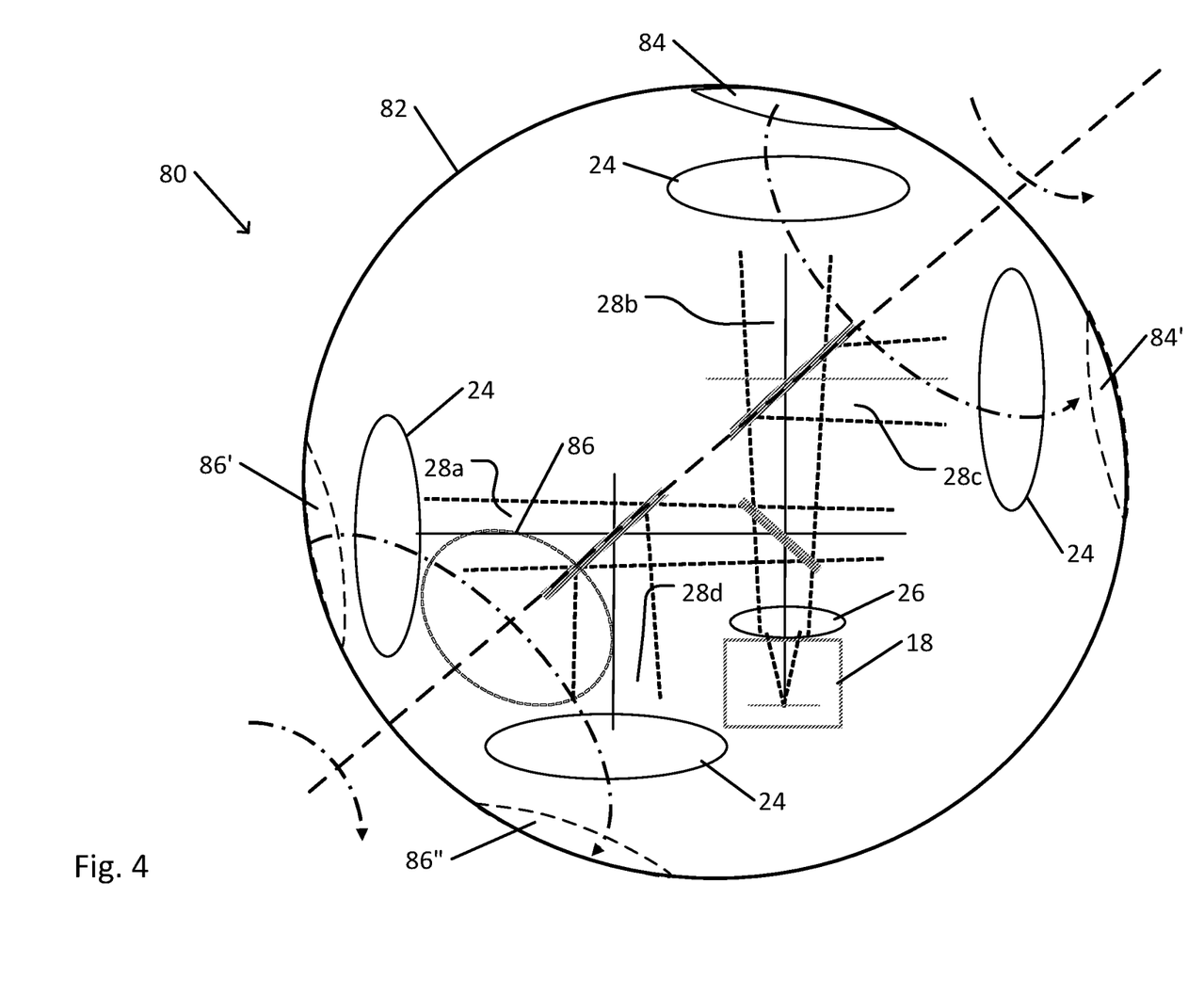
FIG. 4 schematically illustrates a wide-field imaging system having a shutter unit having a single surface with two windows.

FIG. 4 schematically illustrates a wide-field imaging system having a shutter unit having a single surface with two windows.

In wide-field imaging system 80, shutter unit 82 includes a single surface with windows 86 and 84. In the example shown, window 84 is positioned to admit light from field of view 28b. Window 86 is positioned so as not to admit light from any field of view. When window 84 is rotated to position 84', light is admitted from field of view 28c.

When window 86 is rotated to position 86', light is admitted from field of view 28a, while window 84 is not positioned to admit light from any field of view. When window 86 is rotated to position 86", light is admitted from field of view 28d.

Figure 5:
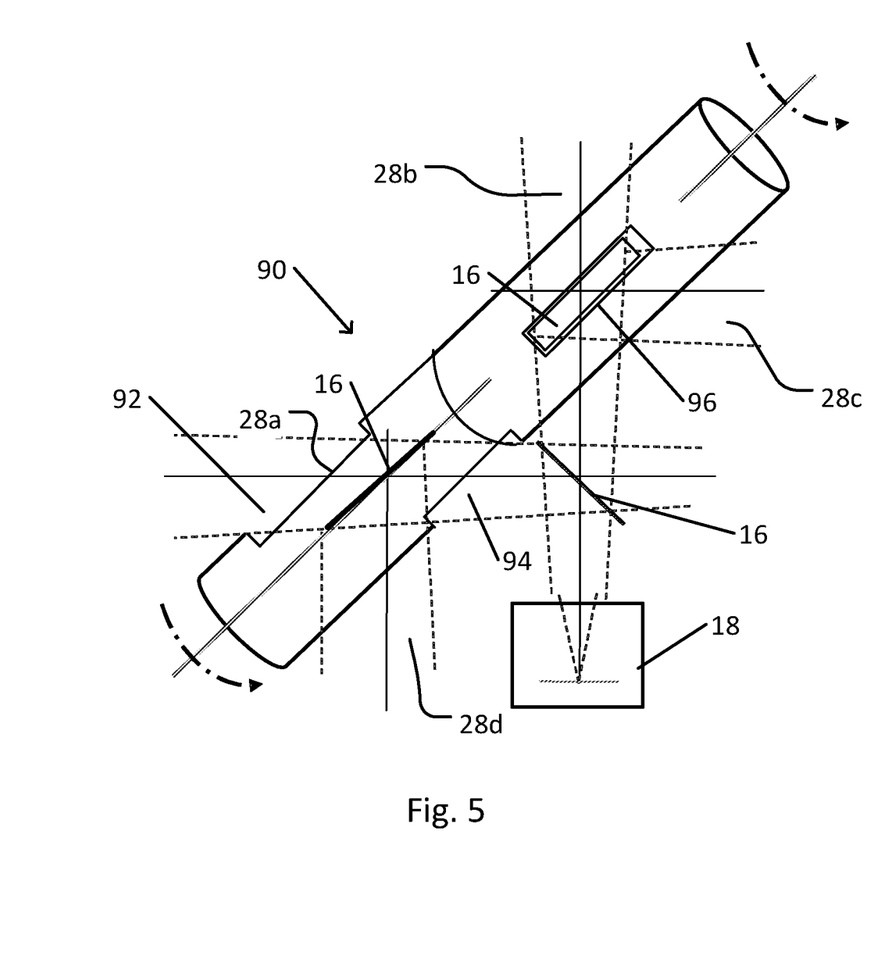
FIG. 5 schematically illustrates a wide-field imaging system having a shutter unit having a cylindrical surface.

FIG. 5 schematically illustrates a wide-field imaging system having a shutter unit having a cylindrical surface.

Shutter unit 90 has a generally cylindrical shape and is rotatable about its cylindrical axis. Shutter unit 90 includes windows 92 and 96 that are rotatable together with shutter unit 90. A beam splitter 16 is configured to rotate together with each of windows 92 and 96 and is located approximately at the cylindrical axis.

Rotation of shutter unit 90 is configured to successively admit light from fields of view 28a and 28d via window 92, the light exiting toward imager 18 via opening 94 opposite window 92. Light from field of view 28b may be admitted via window 96, exiting toward imager 18 via an opening (not shown) opposite window 96. Light from field of view 28c may be admitted via window 96 and may exit toward imager 18 via the same window 96.

Figures 6A, 6B, 6C:
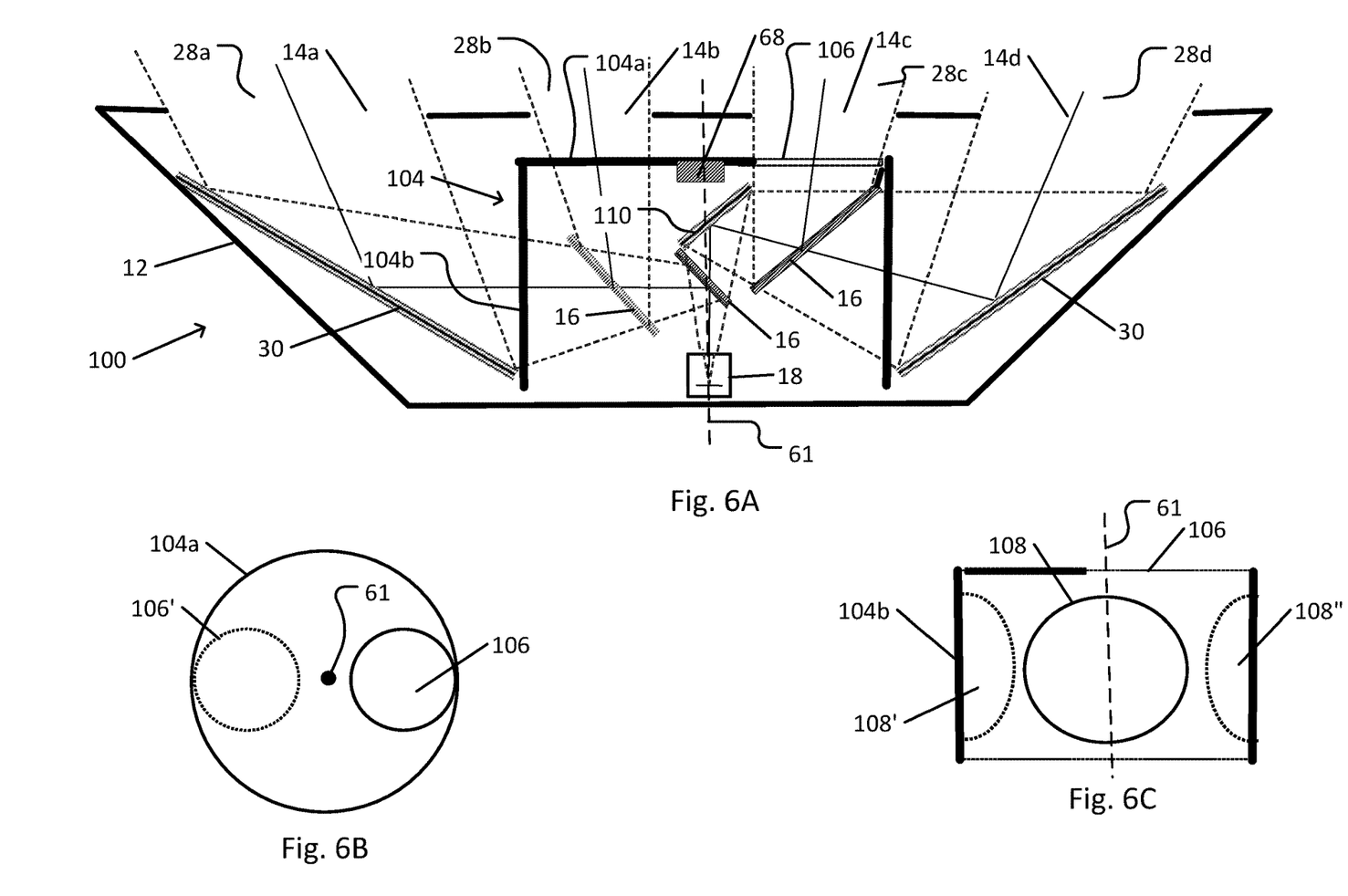
FIG. 6A is a schematic cross section of a wide-field imaging system having a shutter unit with a concave surface.
FIG. 6B shows a cap surface of the concave shutter unit shown in FIG. 6A.
FIG. 6C shows a side wall of the concave shutter unit shown in FIG. 6A.

FIG. 6A is a schematic cross section of a wide-field imaging system having a shutter unit with a concave surface.

Wide-field imaging system 100 is enclosed within opaque enclosure 12. Light from fields of view 28a-28d may be admitted to opaque enclosure 12 via enclosure apertures 14a-14d, respectively. In the example shown, enclosure apertures 14a-14d are linearly aligned. For example, in typical use, the plane of wide-field imaging system 100 may be oriented horizontally, such that fields of view 28a-28d represent adjacent or contiguous horizontal sectors (e.g., similarly to the arrangement shown in FIG. 2) that together form a single field of regard.

Shutter drive motor 68 is configured to rotate concave shutter unit 104 about an axis is configured to rotate about shutter rotation axis 61. A proximal (to imager 18) surface of concave shutter unit 104 is concave. In the example shown, concave shutter unit 104 is cylindrical with cap 104a and side wall 104b. Cap 104a includes axial window 106 and side wall 104b includes lateral window 108 (visible in FIG. 6C) that is oriented at a right angle to axial window 106. In other examples, a surface of concave shutter unit 104 may be continuously curved or bent at an oblique angle. However, in all cases, lateral window 106 is not coplanar with axial window 108.

FIG. 6B shows a cap surface of the concave shutter unit shown in FIG. 6A. FIG. 6C shows a side wall of the concave shutter unit shown in FIG. 6A.

The position of lateral window 108 on side wall 104b is rotated by 90° about shutter rotation axis 61 relative to the position of axial window 106 on cap 104a. Thus, in the configuration shown in FIG. 6A where axial window is aligned with enclosure aperture 14c, no light from any of the other apertures may enter concave shutter unit 104 toward imager 18.

In the configuration shown, axial window 106 is aligned with enclosure aperture 14c to admit light from field of view 28c. Light from field of view 28c may be directed by beam splitters 16 and internal reflector to imager 18. When concave shutter unit 104 is rotated about shutter rotation axis 61 such that axial window 106 has been rotated to position 106', light from field of view 28b may be admitted while blocking light from all of the other fields of view.

In the example shown, single reflectors 30 are configured to redirect light from fields of view 28a and 28d such that the light impinges on side wall 104b of concave shutter unit 104. Therefore, when concave shutter unit 104 is rotated about shutter rotation axis 61 such that later window 108 is brought to one of positions 108' or 108", light may be admitted from field of view 28a or 28d, respectively, while light from all other fields of view is blocked.

Figure 7A:
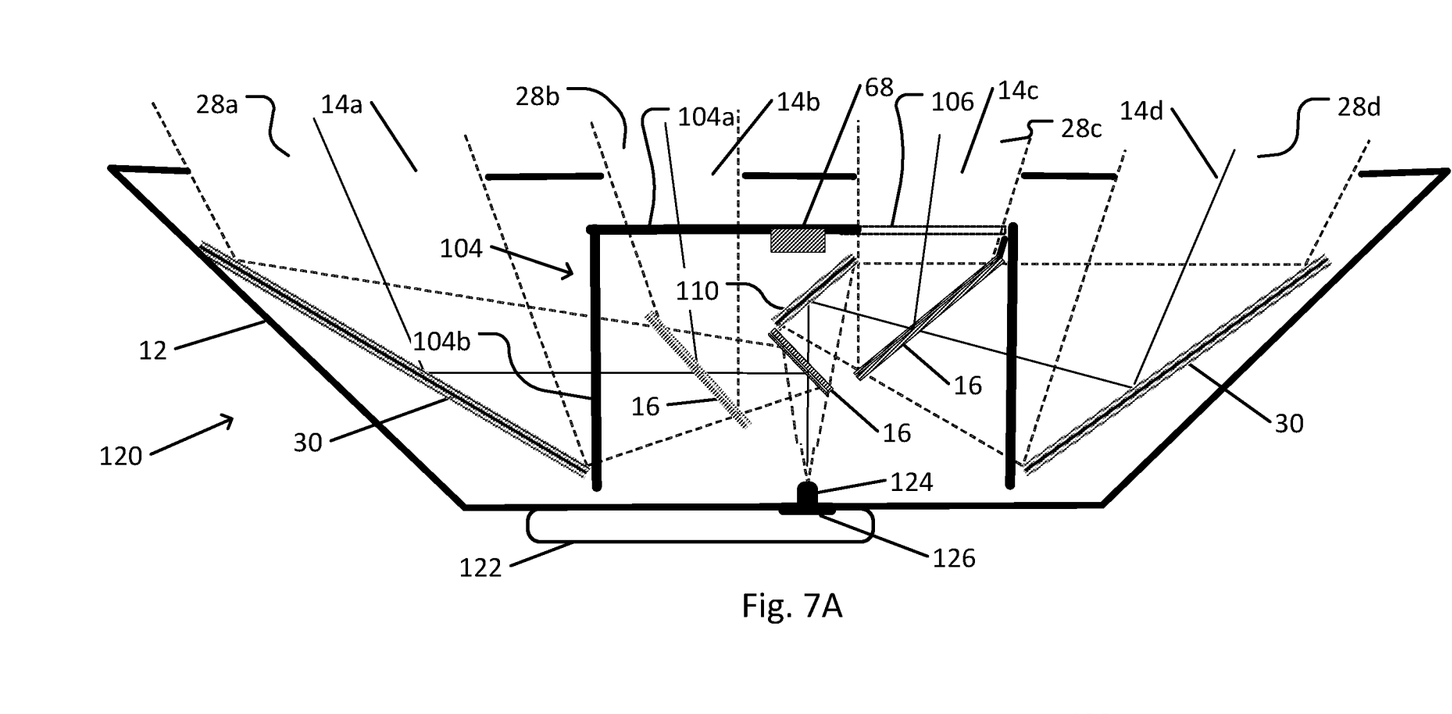
FIG. 7A is a schematic cross section of a wide-field imaging system having a shutter unit with a concave surface, as shown in FIG. 6A, configured for use with a mobile phone.

FIG. 7A is a schematic cross section of a wide-field imaging system having a shutter unit with a concave surface, as shown in FIG. 6A, configured for use with a mobile phone.

Step-stare unit 120 is configured to attach to mobile phone camera 126 of mobile phone 122 (with camera 126 providing the function of imager 18). Step-stare unit 120 may include an appropriate adapter lens 124 (e.g., a narrowing lens). Since a typical pixel size of a mobile phone camera 126 is typically smaller than that of another type of typical imager 18, additional artificial illumination (e.g., provided by a directional illumination unit 42, or another illumination source) may be required under many ambient conditions.

In some cases, wide-field imaging system 120 may be miniaturized for attachment onto a mobile phone to form a portable unit (e.g., easily held in one hand).

Figure 7B:
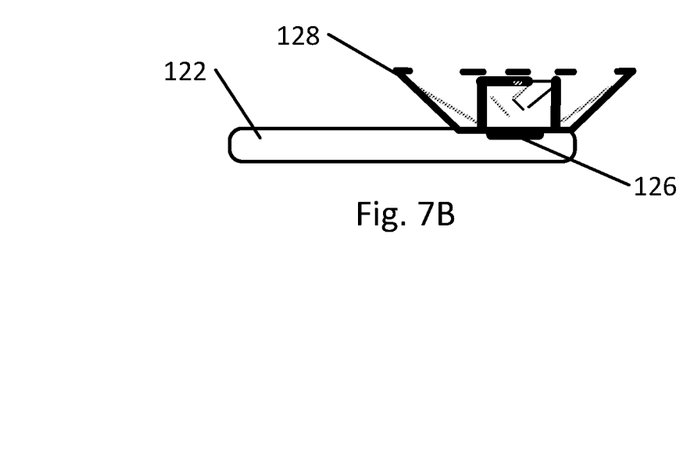
FIG. 7B shows a mobile phone onto which a wide-field imaging system as shown in FIG. 7A is mounted.

FIG. 7B shows a mobile phone onto which a wide-field imaging system as shown in FIG. 7A is mounted.

Miniaturized step-stare unit 128 may be configured to attach to a mobile phone camera 126 of a mobile phone 122. Programming of the phone may enable acquisition of images in a manner coordinated with sequential exposure of mobile phone camera 126 to different fields of view.

Figure 8:
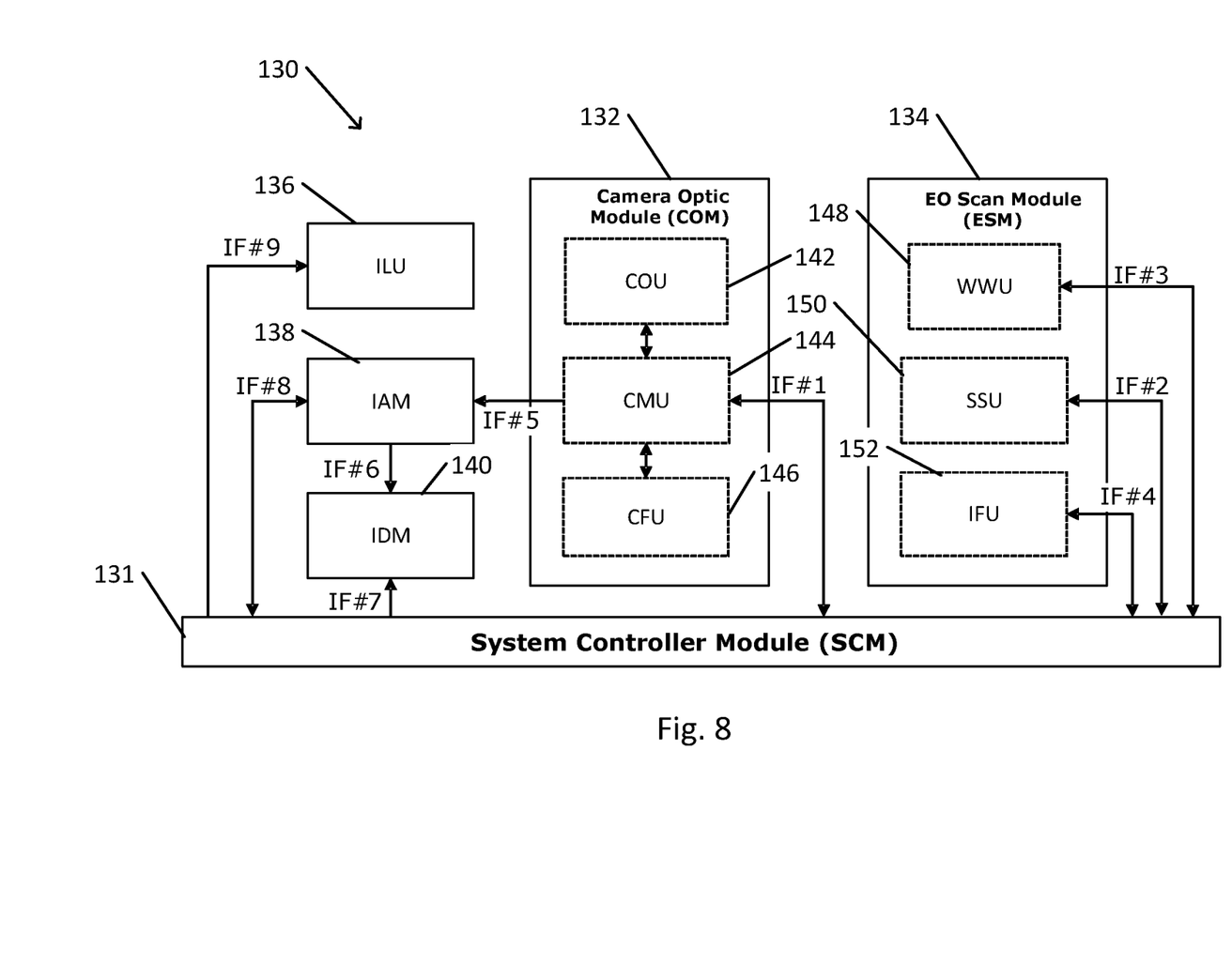
FIG. 8 is a block diagram depicting operation of system that incorporates an example of a wide-field imaging system.

FIG. 8 is a block diagram depicting operation of system that incorporates an example of a wide-field imaging system.

Step-stare wide-field imaging system 130 may include various functional modules. Each of the modules may include one of more hardware devices (e.g., which may include one or more general purpose computers or other data processing units, specialized processors, circuitry, or any combination of the above), and may include programming that is stored or incorporated into the hardware devices to provide functionality of the module. In some cases, a single hardware device may provide functionality for two or more modules.

For example, the functional modules may include one or more of a camera optic module (COM) 132, and electro-optic (EO) scan module (ESM) 134, an illuminator module (ILU) 136 (e.g., for use in adverse environmental and low-contrast conditions), an image analytics module (IAM) 138 (e.g., for optimizing image acquisition under various conditions), an image display module (IDM) 140, or other modules, operation of all of which may be controlled or coordinated by system controller module (SCM) 131. Camera optic module 132 may utilize one or more commercially available large-format video cameras and optics (e.g., using Sony Exmor™ detector technology (e.g., back-illuminated CMOS with extreme sensitivity, e.g., ISO 400,000, or similar technology). The EO scan module 134 may be configured to sequentially switch between a plurality (e.g., three or four, or another number) of fields of view 28a-28d one or more variations of a shutter unit 20.

Camera optic module 132 may include one or more of a camera unit (CMU) 144 (e.g., an imager 18 or other image acquisition device), a camera optic unit (COU) 142 (e.g., imager optics 26 or a combination of imager optics 26 and aperture optics 24, e.g., with focal length 55 mm and FOV of 36 degrees, or otherwise), and camera NIR filter unit (CFU) 146 (e.g., with a wide NIR cutoff filter at 0.75 µm, or otherwise). EO scan module 134 may include one or more of a step-stare switch unit (SSU) 150 (e.g., including shutter unit 20 or any variation of shutter unit 20, e.g., as shown in one of FIG. 3A, 4, 5, 6A, or otherwise, e.g., to achieve a FOR of about 36 degrees×4=144°, or otherwise, and a revisit rate of about 1 Hz to 5 Hz, or otherwise), an illuminator NIR filter unit (IFU) 152 (e.g., utilizing a commercially available NIR filter, e.g., with NIR spectral band from 0.8 µm to about 0.9 µm and larger), and a window wiper unit (WWU) 148 (commercially available, e.g., for use under rainy or foggy conditions). Illuminator module (ILU) 136 may include a commercially available illumination unit, and may provide illumination in one or more spectral bands. Image analytics module (IAM) 138 may include a commercially available hardware board or processor that is configured for one or more of optimizing control of exposure (e.g., iris and ISO settings) as appropriate for each FOV within each FOR, enhancing contrast using a modulated illuminator (e.g., to improve visualization to facilitate detection of objects), and stitching for wide FOR display. Image display module (IDM) 140 may include commercially available components and that may be configured for one or more of enabling operation of a computer/video touch screen, enabling wide area display, providing an object visualization graphic layer, and enabling a touch screen user interface. System controller module (SCM) 131 may utilize a computer or processor for one or more of controlling all system modules, units and interfaces, recording imagery and special events, and transmission of imagery and events.

The functional operation of the system may include one or more of the following interfaces (IF):

SCM 131/CMU 144 via IF #1: controlling exposure, iris, ISO, frame rate, image synchronization, using values determined by defaults, or by CMU 144, or by IAM 138 via IF #8.

SCM 131/SSU 150 via IF #2: controlling frame rate, image synchronization; FOV index, using values determined by defaults, by CMU 144 via IF #1, or by IAM 138 via IF #8.

SCM 131/WWU 148 via IF #3: controlling on/off, speed using values determined by CMU 144 or a user interface.

SCM 131/IFU 152 via IF #4: controlling on/off using values determined by CMU 144 via IF #1, or by IAM 138 via IF #8.

SCM 131/IAM 138 via IF #8: controlling processing/analysis modes, parameters, and results.

SCM 131/ILU 136 via IF #9: controlling on/off, modes, sectors, synchronization.

SCM 131/IDM 140 via IF #7: controlling on/off; modes of display.

CMU 144/IAM 138 via IF #5: providing image relay.

In some applications, a plurality of wide-field imaging systems 10 may be arranged, e.g., in a linear array, with the acquired images being transmitted to a single processor. In this case, the single processor may be configured to combine images from the different systems to create a wider field of regard than would be possible with a single wide-field imaging system 10.

In some cases, a monitoring system may include illumination (e.g., NIR or other illumination) to enhance contrast of imaged objects or people. In some cases, e.g., for rescue and safety monitoring applications, reflectors may be attached to people, clothing, vessels, vehicles, or other objects may also facilitate visibility of these objects. In some cases, use of reflectors may be combined with illumination and image analysis to facilitate identification of a particular object in an imaged FOV or FOR.

In some cases, utilization of scanning illumination element, such as a VIS or NIR LED-based flood light or narrow light beam, may enhance contrast of objects that are suspended in the air (e.g. drones, birds, flies, smoke, debris, rain drops, snowflakes, or other such objects). For example, detection of birds along airport runways is an important safety application. A safety and security application of use is the detection of airborne drones that are small and are designed for low contrast. In daytime, a narrow spectral band filter may be utilized to reject most of the solar irradiance as it generally reduces the contrast of the airborne object. Matching a filter band to an illuminator band may further increase contrast.

In some cases, temporal high-order image derivatives may be computed in detect moving objects, such as a rotor of a drone, thus facilitating discriminating a particular object, such as a drone, form other imaged objects with similar radiance. Strobing an illuminator may further assist in discriminating a moving from the background.

In some cases, multiple wide-field imaging systems 10 may be provided on a vessel of vehicle for covering multiple regions around that vehicle or vessel. For example, such an arrangement may assist in collision avoidance, detecting nearby objects (e.g., a person overboard), and detecting various other emergency situations. Installing a wide-field imaging system 10 at a high point on a vessel or vehicle may reduce occurrence of "dead zones" that cannot be imaged.

One or more wide-field imaging systems 10 may be utilized in covering large crowd scenes, such as a stadium, and may provide sufficient resolution to enable identification of such situations as violent persons, unsafe circumstances (e.g. throwing objects onto the pitch in a stadium), lighting fires, or other situations.

For example, a stadium scene that is imaged by a wide-field imaging system 10 may cover a large crowd scene while providing sufficient resolution to provide visual identification of a person situation of interest.

In some cases, contrast may be enhanced by selective illumination combined with image processing by combining diffuse and specular reflectance properties of imaged objects. Image processing may include spatial filtering, e.g., applying a Gaussian high pass (GHP) filter with spatial standard deviation (SSTD) of about 10 pixels, or another spatial filter, followed by subtraction of the filtered and unfiltered images, e.g., after equalizing in terms of their histogramic STD (HSTD) by a normalized gain factor such that they can be subtracted without a bias due to over-illumination.

In an improved visualization of a scene, a monochromatic ambient image and a monochromatic illuminated image may be combined to provide a single enhanced color image representation that utilizes a wide color gamut in presenting the various contrast enhancements and reversals.

Another scene imaging approach may be followed using a constant illumination source, and intermittently uncovering a reflector on a particular object for improved detectability. This is of particular interest in safety and rescue applications, where it is vital to facilitate and improve the detection of objects in the most challenging imaging situations.

In some cases, e.g., where imaging a human, even when provided with a reflector, against breaking waves, application of a narrow band (e.g. notch) spectral filter (NBSF) to the imager aperture, background clutter which comprises a typically wider spectrum may be reduced while the illuminator received flux is generally retained.

Figure 9:
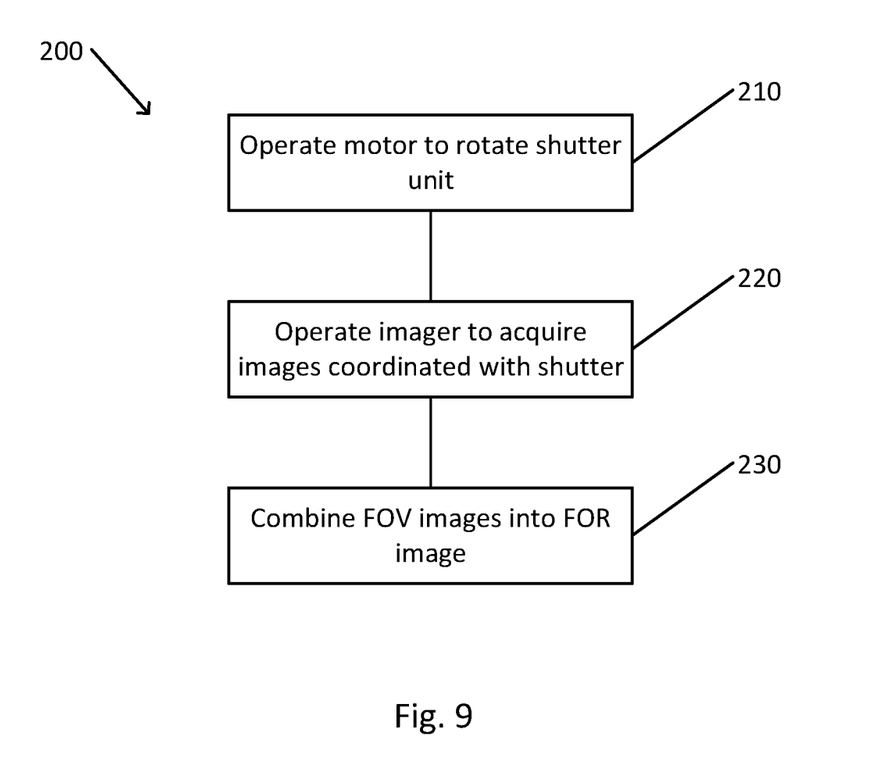
FIG. 9 is a flowchart depicting a method of step-stare operation of a wide-field imaging system as shown in FIG. 1.

FIG. 9 is a flowchart depicting a method of step-stare operation of a wide-field imaging system as shown in FIG. 1.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Step-stare operation method 200 may be executed by a processor, e.g., a system control module 131, of a step-stare wide-field imaging system 130 that includes a wide-field imaging system 10 (to be understood as including any of the variations described herein or otherwise). For example, step-stare operation method 200 may be executed continuously, e.g., whenever power is provided to step-stare wide-field imaging system 130. Alternatively or in addition, step-stare operation method 200 may be executed in response to one or more predetermined events. Such events may include an operator command (e.g., initiated by operation of a user control), receipt of an alarm (e.g., from an automated security system or otherwise), or another event. Execution of step-stare operation method 200 may continue until power supply to step-stare wide-field imaging system 130 is interrupted, or until occurrence of another predetermined event.

Step-stare operation method 200 may include operating shutter drive motor 68 to rotate shutter unit 20 (block 210). Rotation of shutter unit 20 may sequentially expose and admit light from each of a plurality of fields of view (e.g., fields of view 28a-28d or another number or configuration of fields of view). Admitted light from a field of view is directed by an arrangement of beam splitters, and in some case reflectors, to an imager 18 (or other imaging device).

Imager 18 may be operated in coordination with rotation of shutter unit 20 to acquire sequential images of the exposed fields of view (block 220). For example, an image may be acquired whenever a window of shutter unit 20 is aligned with an aperture (e.g., one of enclosure apertures 14a-14d) of opaque enclosure 12 of wide-field imaging system 10.

For example, image processing may be applied to determine when a window of shutter unit 20 is aligned with an enclosure aperture 14a-14d (e.g., by overall image brightness). Alternatively or in addition, shutter unit 20 may be provided with an encoder, or other sensor, to determined a current rotation angle of shutter unit 20, e.g., relative to one or more enclosure apertures 14a-14d.

In some cases, illumination may be provided in coordination with acquisition of images. For example, directional illumination may be directed at currently imaged field of view, or at an object or region of interest. In some cases, reflective, fluorescent, or phosphorescent markers may be provided on particular objects or people in an imaged field of view or field of regard. In some cases, illumination may be provided in a particular spectral band, while imager 18 may be provided with a filter with a particular spectral transmittance.

Acquired images of the various fields of view may be combined into an image of a field of regard that includes some or all of the imaged fields of view (block 230). For example, images of adjacent horizontal fields of view may be combined into a single image of wide field of regard.

In some cases, various image processing techniques (e.g., registration, spatial, temporal, or spectral filtering, image subtraction, brightness adjustment, or other techniques) may be applied prior to, or after, combination of the images. Application of the image processing techniques may enable enhancing visibility of a particular type of object or occurrence.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An imaging system comprising:
a stationary imager;
an opaque enclosure comprising a plurality of apertures at different locations on the enclosure, a plurality of stationary beam splitters arranged within the enclosure such that light that enters the enclosure through each aperture of the plurality of apertures is directed to the imager; and
a shutter unit comprising an opaque surface that includes at least one window, the
shutter unit rotatable relative to the enclosure such that said at least one window is sequentially aligned with each aperture of the plurality of apertures to enable light from a field of view to enter the enclosure through that aperture, the opaque surface preventing light from concurrently entering the enclosure through more than one of the apertures;
wherein the opaque surface comprises two concentric disks on opposite sides of a beam splitter of the plurality of beam splitters, each of the disks including an eccentric window of said at least one window, the eccentric window of one of the disks rotated about a common axis of the disks, such that when the eccentric window of one of the disks is positioned to enable light to impinge on that beam splitter via an aperture of the plurality of apertures on one side of that beam splitter, the other disk blocks entry of light through another aperture on an opposite side of that beam splitter.

2. The system of claim 1, wherein each aperture of the plurality of apertures is configured to enable light to enter the enclosure from a different field of view.

3. The system of claim 2, wherein at least two of the different fields of view comprise adjacent fields of view.

4. The system of claim 2, further comprising an illumination source that is configured to illuminate each field of view of the plurality of fields of view concurrently with said at least one window being aligned with the aperture of the plurality of apertures that is configured to enable light to enter the enclosure from that field of view.

5. The system of claim 1, wherein an aperture of the plurality of apertures is provided with a reflector to reflect light into the aperture from the field of view.

6. The system of claim 1, wherein each aperture of the plurality of apertures is provided with an objective lens.

7. The system of claim 6, wherein the imager is provided with a relay lens.

8. The system of claim 1, wherein the shutter unit comprises a drive motor for rotating the opaque surface.

9. The system of claim 8, wherein the drive motor is a direct current motor.

10. The system of claim 1 wherein the stationary imager comprises a camera of a mobile phone that is attachable to the enclosure.

11. The system of claim 1, further comprising a device configured to acquire an image of the field of view in a spectral range that is different, from a spectral range of the imager.

12. An imaging system comprising:
a stationary imager;
an opaque enclosure comprising a plurality of apertures at different locations on the enclosure, a plurality of stationary beam splitters arranged within the enclosure such that light that enters the enclosure through each aperture of the plurality of apertures is directed to the imager; and a shutter unit comprising an opaque surface that includes at least one window, the shutter unit rotatable relative to the enclosure such that said at least one window is sequentially aligned with each aperture of the plurality of apertures to enable light from a field of view to enter the enclosure through that aperture, the opaque surface preventing light from concurrently entering the enclosure through more than one of the apertures;

wherein the opaque surface comprises a concave surface that is rotatable about the plurality of apertures, the concave surface including an axial window of said at least one window, and a lateral window of said at least one window, the lateral window being non-coplanar with the axial window.

\* \* \* \* \*